W. H. FULTON.
COUPLING FOR PIPES.
APPLICATION FILED AUG. 15, 1919.

1,368,919.

Patented Feb. 15, 1921.

William H. Fulton INVENTOR

BY

Thomas Howe ATTORNEY

UNITED STATES PATENT OFFICE.

WILLIAM H. FULTON, OF IRVINGTON, NEW JERSEY, ASSIGNOR TO TITEFLEX METAL HOSE CORPORATION, A CORPORATION OF NEW YORK.

COUPLING FOR PIPES.

1,368,919.  Specification of Letters Patent.  Patented Feb. 15, 1921.

Application filed August 15, 1919. Serial No. 317,643.

*To all whom it may concern:*

Be it known that I, WILLIAM H. FULTON, a citizen of the United States of America, residing at Irvington, Essex county, and State of New Jersey, have invented new and useful Improvements in Couplings for Pipes, of which the following is a specification.

This invention relates to an improved fitting having improved means for securing the end of a pipe or hose to a union whereby the hose or pipe may be attached to a terminal fitting or to another length of pipe either flexible or stiff.

In my application Serial Number 218,205, filed February 20th, 1918, I have shown and described an improved pipe coupling for the purposes specified. The present invention, like that of my prior application, avails of the pressure of the fluid in the pipe to secure the hose to the fitting, and according to the present invention also, increase in pressure of the fluid causes the hose the more firmly to be secured to the fitting and opposition to disruption or leakage is increased. It has been found, however, that it is often difficult, particularly in the case of heavy hose or of hose not possessing a high degree of flexibility, to manipulate integral parts of the hose to properly coöperate with the hose in joining it to the coupling so that such joining of the hose, even when it is heavy or comparatively stiff is facilitated. In fact it may be accomplished when the hose or pipe is rigidly stiff. The present invention may therefore be said to be an improvement upon the device of my prior application above referred to.

The main object of this invention is to provide a pipe or hose coupling which shall facilitate the formation of the coupling and which shall be efficient in operation.

Other and ancillary objects of the invention will appear hereinafter.

In the accompanying drawings which illustrate the invention—

Figure 1:
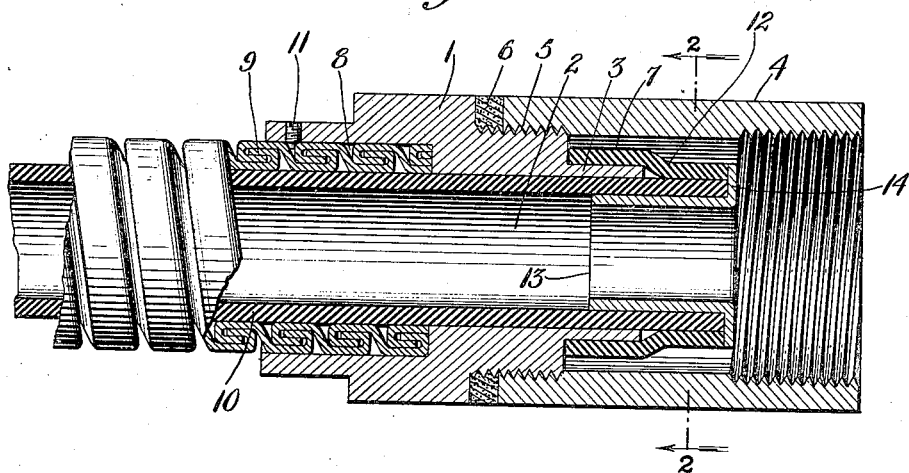
Figure 2:
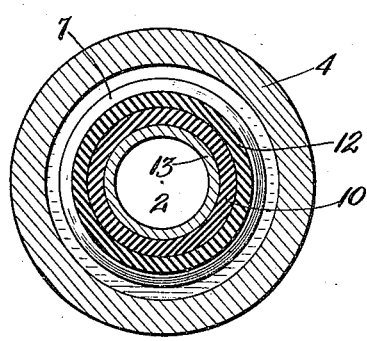

Figure 1 is a longitudinal central section of a coupling embodying the invention; and Fig. 2 is a section on the line 2—2 of Fig. 1.

Referring to the drawings, the fitting comprises a body portion 1, having a fluid passage 2 and tubular extension 3, which is surrounded by a sleeve 4 screw-threaded at 5 to the body 1. To avoid leakage a packing ring 6 may be inserted between the end of the sleeve 4 and the fitting body. Between the sleeve 4 and the extension 3 is formed a chamber 7 which is in communication with the fluid passage. At the end of the fitting opposite the extension 3 is formed an enlarged bore or socket 8 adapted to receive an armor 9 for the flexible hose or pipe 10 of rubber. The armor may consist in a tube formed of a helically wound metal strip having the edges of adjacent convolutions interfolded and clearance provided in the interfold so that there may be sliding in the joints to provide flexibility of the armor tube. The structure of this character of tube is well known in the art and need not be further described in detail. It may be secured in the fitting by the one or more set screws 11. The pipe 10 extends through the passage 2 and also through the tubular extension 3 and projects beyond latter as shown. Surrounding the extension 3 and the end of the pipe 10 and engaging with both of them is a flexible band 12 of rubber. Within the end of the pipe 10 is inserted a ferrule or sleeve 13 having an outwardly turned flange 14 against which the ends of the pipe 10 and the band 12 abut. This ferrule holds the tube in proper position at all times whether pressure is on or off. When fluid under pressure is passed through the apparatus it bears upon the outside of the band 12 and presses it against the extension 3 and also the end of the hose or pipe 10. In this manner a fluid tight joint is formed between the fitting and the pipe 10. As the fluid pressure increases the pressure upon the band 12 is increased and it is the more firmly pressed against the extension 3 and the end of the pipe 10, so that the joint is made even more secure against leakage. It will thus be seen that with increase of the fluid pressure within the device, the joint between the fitting and pipe is more tightly secured so that the structure is well adapted for use with very high pressures.

While the invention has been illustrated in what is considered its best application, it may have other embodiments without departing from its spirit and is not, therefore, limited to the structure shown in the drawings.

What I claim is:

1. The combination with a fitting having a fluid passage, of a pipe extending through said passage and a flexible member separate from said pipe and forced against said fitting and said pipe by the pressure of the fluid in said passage.

2. The combination with a fitting having a fluid passage and a tubular extension about said passage, of a tube or pipe extending through said passage, a flexible member separate from said pipe or tube and forced against said extension and said pipe or tube by the pressure of the fluid in said passage.

3. The combination with a fitting having a fluid passage, a tubular extension about said passage and a sleeve surrounding said extension, and spaced therefrom to form a chamber communicating with said passage, of a tube or pipe extending through said passage, and a flexible member separate from said pipe or tube, surrounding said pipe or tube and said extension, and forced against said extension and said pipe or tube by the fluid pressure of said passage.

4. The combination with a fitting having a fluid passage of a pipe or tube extending through said passage, an armor surrounding said pipe or tube and secured to said fitting, and a flexible member separate from said pipe or tube and forced against both the fitting and said pipe or tube, to form a fluid tight joint therebetween, by the fluid pressure of said passage.

5. The combination with a fitting having a fluid passage, of a flexible tube extending through said passage, a sleeve within said tube and a flexible member engaging said tube about said sleeve and forced against said tube and fitting by the fluid pressure of said passage.

6. The combination with a fitting having a fluid passage, of a flexible tube extending through said passage, a flanged ferrule or sleeve entered within the end of said tube, and a flexible member engaging with said tube and fitting and forced thereagainst to form a fluid tight joint therebetween by the fluid pressure in said passage.

7. The combination with a fitting having a fluid passage and a tubular extension about said passage, of a flexible tube extending through said passage, a ferrule inserted within the end of said tube, and a flexible band surrounding said extension and that portion of the tube resting upon the ferrule, said band being forced against said extension and tube to form a fluid tight joint by the fluid pressure of said passage.

In testimony whereof I have signed this specification this 14th day of August, 1919.

WILLIAM H. FULTON.